Patented June 23, 1925.

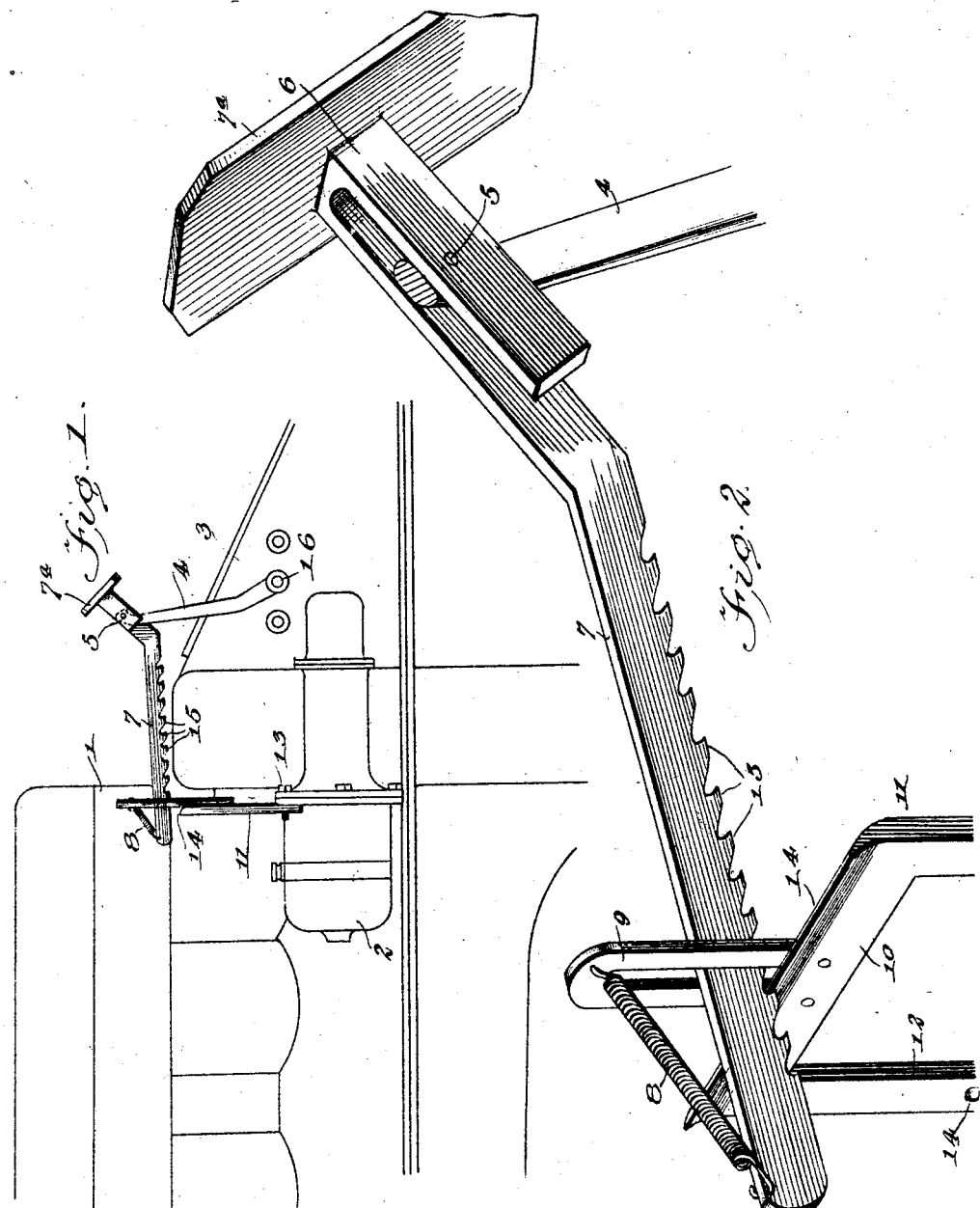

1,542,904

UNITED STATES PATENT OFFICE.

REINHART L. NORDNESS, OF LILY, SOUTH DAKOTA, ASSIGNOR OF ONE-HALF TO HENRY A. ROSETH, OF LILY, SOUTH DAKOTA.

CLUTCH-PEDAL CONTROL.

Application filed May 7, 1923. Serial No. 637,334.

*To all whom it may concern:*

Be it known that I, REINHART L. NORDNESS, a citizen of the United States, and a resident of Lily, in the county of Day and State of South Dakota, have invented certain new and useful Improvements in Clutch-Pedal Controls, of which the following is a specification.

This invention relates to clutch pedal controls for the well known Ford construction.

An object of the invention is the provision of a device for controlling the clutch pedal in either one of its three positions, high, low or neutral and without the necessity of requiring the operator of the car to maintain his foot on the pedal.

A further object of the invention is the provision of a clutch pedal control for the usual high and low speed of a Ford which will maintain said pedal in a neutral position thereby eliminating the use of the emergency brake for placing the clutch pedal in neutral position when it is desired to throw the transmission mechanism into reverse.

Other objects and advantages will become apparent during the course of the following description.

The invention is illustrated by way of example in the accompanying drawings, in which, Figure 1 is a side elevation disclosing a Ford engine and transmission with my improved invention applied to the high and low speed pedal.

Figure 2 is a view in perspective of an embodiment of my invention.

Referring to the drawings, 1 designates a Ford automobile with which is associated a starter 2 and a transmission casing 3.

The reverse pedal and the service brake pedal are omitted. The usual high and low speed clutch pedal is designated by the numeral 4.

The usual high and low speed pedal 4 is sheared off at its upper end and perforated to receive a pin 5. The pin is adapted to be received by a pair of alined perforations in legs of a U-shaped member 6 formed at the inner free end of a substantially horizontal oscillating bar 7. On the outer end of the bar 7 is mounted a tread 7ª which is adapted to be engaged by the foot of the operator of a car. The pin 5 engaged by the perforations in the U-shaped member 6 forms a pivotal connection between the lever 4 and the bar 7. The outer end of the bar 7 is perforated to receive one end of a coil spring 8. The other end of the coil spring is secured to the upper end of a U-shaped guide 9 through which the bar 7 oscillates and which is connected at its lower end to a horizontal member 10 of a U-shaped bracket 11. The legs 12 of said U-shaped bracket are secured as is shown in Figure 1, to the starter 2 by removing the usual bolts 13 for securing the upper end of the starter in position and inserting said bolts through the perforations 14 in the legs of the U-shaped bracket 11.

Where starters are not employed on cars the U-shaped bracket 11 may be secured in any appropriate manner to the frame or dash of the automobile. The horizontal member 10 of the bracket is provided with a knife edge keeper 14 which is adapted to be engaged by any one of a plurality of teeth 15 located upon the lower edge of the bar 7.

The spring 8 maintains the bar 7 in such a position that the lever 4 will hold the gear of the transmission unit 3 normally in high gear when the teeth of said bar are out of engagement with the keeper 14.

The operation of my device is as follows:

As shown in Figure 1 the pedal 4 is positioned by the spring 8 through the toothed bar for holding the clutch shaft 16 at a point in its rotation where the clutch will be thrown in "high." Pressure on the tread 7ª will force the lever 4 forwardly and likewise the toothed bar 7 and when a tooth which is located intermediate the end of the bar 7 is engaged by the keeper 14 of the bracket 11, the clutch will be located in neutral. Still further pressure upon the tread 8 will move the lever 4 and the toothed bar further forwardly against the tension of the spring 8 and when one of the teeth adjacent the inner end of the bar 7 is engaged by the keeper 14, the lever 4 will bring the low gear into play.

When it is desired to release the bar 7 from the bracket 11 pressure is applied to the lower end of the tread 7ª for disengaging the teeth from the bracket and by removing the foot from said tread the spring 8 will force the bar 7 and the lever 4 rearwardly and instantly cause the shaft 12 to throw the gear into "high."

What I claim is:

1. A clutch pedal comprising a rockable lever, a bar pivotally mounted at one end on said lever, a guide for the bar, said bar being provided with a plurality of teeth and having an end projecting through and beyond said guide, a keeper engageable with the teeth, means for resiliently connecting the projecting end of the bar to the guide whereby said ends will normally tend to move upwardly when the lever is rocked, and a tread on the end of the bar adjacent its pivotal point on the lever.

2. A clutch pedal comprising a rockable lever, an oscillating bar pivotally mounted at one end on said lever, a guide for said bar, said bar being provided with a plurality of teeth, a keeper on the guide and located in the path of the oscillating bar and engageable with the teeth, a spring for resiliently suspending the other end of the bar from the guide and at one side of the guide which is remote from the pivotal connection of the bar with the lever, and a tread on the end of the bar adjacent the pivotal point of the lever.

3. A clutch pedal comprising a rockable lever, an oscillating bar pivotally mounted at one end on said lever, said bar being provided with a plurality of teeth, a bracket having a keeper engageable with the teeth, an inverted U-shaped member secured to the bracket for receiving and guiding the bar in a path for engaging the keeper, a spring connected at one end to the free end of the guide and its other end connected to the other end of the oscillating bar for resiliently suspending said end of the bar, and a tread on the end of the bar adjacent its pivotal point on the lever.

REINHART L. NORDNESS.